UNITED STATES PATENT OFFICE.

SAMUEL CLELAND DAVIDSON, OF BELFAST, IRELAND.

TREATMENT OF RUBBER LATEX.

1,381,455.  Specification of Letters Patent.  Patented June 14, 1921.

No Drawing.  Application filed February 24, 1920. Serial No. 360,833.

*To all whom it may concern:*

Be it known that I, SAMUEL CLELAND DAVIDSON, a subject of the King of Great Britain and Ireland, of Belfast, Ireland, merchant, have invented certain new and useful Improvements in and Relating to the Treatment of Rubber Latex, of which the following is a specification.

My herein described improvements relate to the coagulation of raw rubber from the latex of rubber trees (more especially those of the *Hevea Brasiliensis* variety) which latex has primarily, and while still perfectly fresh after being tapped, been preservatively treated with an alkalized phenol or phenoloid, substantially in accordance with the prior patents granted to me, and numbered 1,145,352 and 1,146,851.

I have already imported latex, when so treated, into the British Isles in small but sufficient quantities as specimen consignments from the eastern rubber estates, to practically demonstrate that latex can be not only imported, but also kept for several years in as good condition for coagulation of the raw rubber thereform as when freshly tapped from the rubber trees, and I have also, when lately, experimentally, testing the operative effects of my herein described invention, coagulated and obtained from this latex, even when some of what I thus used was more than three years old, a full coagulum of an excellent quality of raw rubber similar to what would have been obtainable from the same latex, if it had been coagulated at once after being freshly tapped at the rubber estates.

I have thus demonstrated that, when latex has been preservatively treated, as above referred to, it can be imported from the rubber estates to America, Europe, and elsewhere, and in such good condition that coagulation of the raw rubber therefrom could be done in commercial quantities, at any convenient time after its arrival at the factories of the makers of finished and vulcanized rubber goods.

The object of my present invention is to obtain from said preservatively treated latex an improved quality and strength of raw rubber, by effecting its coagulation therefrom (whether done at the rubber estates, or at the factories of the vulcanizing manufacturers) with a new fluid mixture which, for brevity of description, is hereinafter referred to as the "coagulating fluid" and which consists of an acidified aqueous solution of a soluble magnesium salt, preferably sulfate of magnesia.

This coagulating fluid I usually prepare as follows:—

To 100 parts by measure of water, I add 1 part by weight of sulfate of magnesia, which readily dissolves therein, and also 1½ to 2 parts by measure of ordinary commercial sulfuric acid, or, alternatively, 3 to 4 parts of pyroligneous acid. The acidified aqueous solution thus prepared, whether it be solidified with sulfuric, or with pyroligneous acid, constitutes said coagulating fluid, a sufficient quantity of which, when added to the preservatively treated latex, causes a vigorous and complete coagulation of the contained rubber, together with a satisfactory separation therefrom of the mother liquor, and its contained impurities, which still remain dissolved therein.

Chlorid of magnesia can, if desired, be used as a substitute for sulfate of magnesia in the preparation of said coagulating fluid, but I prefer the sulfate and magnesia preparation, as it usually gives a better quality of rubber, and, being cheaper, is more economical to use.

The quantity of said coagulating fluid ordinarily required to effect this result is, on or about half that of the preserved latex being treated, but as the strength of the latex, or the amount of the preservative treatment previously applied to it may vary, so also may vary the quantity of coagulating fluid required to effect complete coagulation of the contained rubber—consequently it is not practicable to state any definite amount to employ.

In the preparation of said coagulating fluid, other acids than sulfuric or pyroligneous can also be used, and I do not limit myself to the employment of any particular acid, nor to the hereinbefore mentioned relative proportions of acid to the magnesium salt, nor to the water of dilution employed therewith, as these proportions may be varied within considerable limits, but I have found the proportions hereinbefore mentioned give satisfactory results.

The coagulated rubber when thus obtained may now be immersed for a few minutes in hot or boiling water, which renders it very pliable and easy to roll out into thin sheets in the ordinary way, whereby the bulk of the remaining mother liquor, and uncombined or free moisture contained therein, is expelled, and, if so desired, these sheets can thereafter be pressed into blocks, or finished in any other suitable commercial form, but I preferably, from immediately after coagulation of the rubber from the latex, carry out its further preparation by passing a thick layer of it, firstly, through my dehydrating apparatus described in my co-pending application, Serial No. 358,441 wherein the rubber is perforated by numerous sharply pointed pins which pierce any existing bubbles, and, at the same time, largely dehydrate the layer, and reduce it in thickness to a somewhat mat-like form, which I then immerse for a few minutes in hot or boiling water. This, as already mentioned, renders it very pliable and easy to roll out into thin sheets by passing it through any suitable form of mangle rollers, in which operation nearly all of the remaining mother liquor, and uncombined or free moisture is expelled. It then only requires the surface water to be removed therefrom in any suitable way for these sheets to be considered as marketable rubber, but if thus left in sheet form, a very large surface area remains exposed to atmospheric action, and, as it is desirable, as far as possible, to reduce this exposed surface, I preferably roll each of these sheets up on itself into a bar-like form, and pass same into my triplex roller, as described in my Patent No. 1,287,253 which kneads and welds the successive laminations thereof into a solid round bar, the exposed surface area of which is relatively so small as to be negligible, while its interior is practically impervious to any detrimental atmospheric effects.

The rollers employed in any of the above mentioned operations should, in order to obtain best results, be maintained in a moderately heated condition, and preferably by having a supply of hot water trickling over them while operating, which also has a beneficial cleansing effect on the surface of the rubber.

Raw rubber when thus prepared from the hereinbefore referred to preservatively treated latex, possesses very excellent keeping qualities and elasticity to a very remarkable degree, with also great tensile strength, and a remarkable freedom from any tendency to tackiness, while, at the same time, it possesses good vulcanizing characteristics and uniformity of quality. Its keeping qualities are so excellent that, without risk of any subsequent bacterial development of fungus, or mold spots, it can now be packed for despatch to the market, or for immediate use by the vulcanizing manufacturers, without requirement, at this stage, for any evaporative drying, which so shortens the time necessary for my herein described coagulation treatment and subsequent system of preparation, that counting from when the coagulating treatment of the preserved latex commences, the raw rubber can be brought to this finished condition in less than an hour, whereas, according to the hitherto ordinary method of manufacture now generally prevailing at the eastern rubber plantations, it frequently takes a couple of weeks or more to get the raw rubber ready for packing, because, in order to insure its keeping in good condition, almost complete evaporative drying is essential, which is a very tedious process, involving much careful attention, owing to its being necessarily a continuous operation during both day and night.

What I claim and desire to secure by Letters Patent is:—

1. In the coagulation treatment of rubber latex which, while still in perfectly fresh condition after being tapped, has been preservatively treated with an alkalized phenol or phenoloid, the employment of a coagulating fluid, consisting of an acidified aqueous solution of a soluble salt of magnesium for effecting the coagulative separation of the raw rubber therefrom.

2. In the coagulation treatment of rubber latex, which, while still in perfectly fresh condition after being tapped, has been preservatively treated with an alkalized phenol or phenoloid, the employment of an acidified aqueous solution of sulfate of magnesia, for effecting the coagulative separation of the raw rubber therefrom.

3. Raw rubber which has been coagulated by an acidified aqueous solution of a soluble salt of magnesium, from latex which has been preservatively treated with an alkalized phenol or phenoloid.

4. Raw rubber which has been coagulated by an acidified solution of sulfate of magnesia from latex which has been preservatively treated with an alkalized phenol or phenoloid.

In witness whereof, I have hereunto signed my name in the presence of two subscribing witnesses.

SAMUEL CLELAND DAVIDSON.

Witnesses:
ALFRED AGAR,
ALEXANDER BROWN.